US010663073B2

(12) United States Patent
Da Silva et al.

(10) Patent No.: US 10,663,073 B2
(45) Date of Patent: May 26, 2020

(54) THERMOSTATIC DEVICE FOR CONTROLLING THE CIRCULATION OF A FLUID, AND THERMOSTATIC VALVE INCLUDING SUCH A DEVICE

(71) Applicant: VERNET, Ollainville (FR)

(72) Inventors: William Da Silva, Saint Germain les Arpajon (FR); Lionel Mabboux, Sainte Genevieve des Bois (FR)

(73) Assignee: VERNET, Ollainville (FR)

( * ) Notice: Subject to any disclaimer, the term of this patent is extended or adjusted under 35 U.S.C. 154(b) by 91 days.

(21) Appl. No.: 15/560,437

(22) PCT Filed: Mar. 24, 2016

(86) PCT No.: PCT/EP2016/056547
§ 371 (c)(1),
(2) Date: Sep. 21, 2017

(87) PCT Pub. No.: WO2016/151088
PCT Pub. Date: Sep. 29, 2016

(65) Prior Publication Data
US 2018/0066761 A1    Mar. 8, 2018

(30) Foreign Application Priority Data

Mar. 24, 2015 (FR) ...................... 15 52425

(51) Int. Cl.
*F16K 31/00* (2006.01)
*G05D 23/02* (2006.01)
(Continued)

(52) U.S. Cl.
CPC .............. *F16K 31/002* (2013.01); *F01P 7/16* (2013.01); *F16K 1/46* (2013.01); *F16K 1/465* (2013.01); *G05D 23/022* (2013.01)

(58) Field of Classification Search
CPC .......... F16K 31/002; F16K 1/46; F16K 1/465; G05D 23/024; G05D 23/022
See application file for complete search history.

(56) References Cited

U.S. PATENT DOCUMENTS 3,248,056 A  *  4/1966  Obermaier  ........... G05D 23/022
                                                     236/34
3,409,039 A     11/1968  Griffin
(Continued)

FOREIGN PATENT DOCUMENTS

| CN | 1262384 A | 8/2000 |
| CN | 201763433 U | 3/2011 |
| CN | 102536417 A | 7/2012 |

OTHER PUBLICATIONS

International Search Report dated Jul. 4, 2016 during the prosecution of International Application No. PCT/EP2016/056547.

*Primary Examiner* — Nelson J Nieves
(74) *Attorney, Agent, or Firm* — Troutman Sanders LLP

(57) ABSTRACT

A thermostatic device including a thermostatic element and a stopper, axially movable about a stationary seat of a housing, opening and closing a passage circulating fluid and connected to a movable portion of the thermostatic element. During expansion of a thermoexpansible material of the thermostatic element, the movable portion drives the stopper axially relative to the seat. The stopper includes a seal, resting tightly against the seal when the fluid circulation passage is closed by the stopper, a first part, with an inner bore receiving the movable portion, and a second part, separate from the first part, the seal being axially charged between the first and second parts. The first and second parts are made of metal, the second part is mounted around the first part, the part facing the axis of the second part forms a peripheral edge attaching said second part to the outer surface of the first part, and the first part forms an axial (Continued)

abutment for the edge of the second part, positioning the first and second parts axially relative to one another by applying a predetermined clamping load to the seal.

20 Claims, 4 Drawing Sheets

(51) Int. Cl.
*F16K 1/46* (2006.01)
*F01P 7/16* (2006.01)

(56) References Cited

U.S. PATENT DOCUMENTS

| | | | | |
|---|---|---|---|---|
| 4,257,553 A | * | 3/1981 | Sliger | G05D 23/022 236/34.5 |
| 4,283,823 A | * | 8/1981 | Buswell | G05D 23/024 236/34.5 |
| 4,630,770 A | * | 12/1986 | Sliger | G05D 23/1333 236/34.5 |
| 4,691,861 A | * | 9/1987 | Sliger | G05D 23/1333 236/34.5 |
| 4,763,834 A | * | 8/1988 | Duprez | F01P 7/16 236/34.5 |
| 5,549,244 A | * | 8/1996 | Kai | F01P 7/16 165/300 |
| 5,603,485 A | * | 2/1997 | Schwarz | G05D 23/021 137/516.29 |
| 5,899,378 A | * | 5/1999 | Hainle | F02M 31/07 156/73.5 |
| 8,028,926 B2 | | 10/2011 | Heldberg et al. | |
| 8,028,936 B2 | | 10/2011 | McDermott | |
| 9,133,942 B2 | * | 9/2015 | Ito | F16K 1/46 |
| 2002/0059906 A1 | * | 5/2002 | Friesenhahn | F01P 7/16 123/41.1 |
| 2007/0261738 A1 | | 11/2007 | Mace | |
| 2008/0135633 A1 | * | 6/2008 | Heldberg | F16K 31/002 236/34.5 |
| 2010/0077583 A1 | * | 4/2010 | Takaya | F01P 7/16 29/213.1 |
| 2010/0089467 A1 | * | 4/2010 | Bouloy | F16K 31/002 137/468 |
| 2010/0230504 A1 | * | 9/2010 | Pottie | G05D 23/022 236/93 R |
| 2011/0198518 A1 | * | 8/2011 | Habermann | F16K 31/002 251/11 |
| 2013/0112763 A1 | * | 5/2013 | Roman | F16K 31/002 236/101 R |
| 2013/0126624 A1 | * | 5/2013 | Park | F16K 1/36 236/34.5 |
| 2013/0180477 A1 | * | 7/2013 | Nakajima | F01P 7/167 123/41.05 |
| 2013/0200167 A1 | * | 8/2013 | Auweder | F01P 7/16 236/93 R |
| 2013/0264393 A1 | * | 10/2013 | Onishi | G01K 5/44 236/93 A |
| 2013/0334324 A1 | * | 12/2013 | Ruga | F16K 11/074 236/12.13 |
| 2014/0345711 A1 | * | 11/2014 | Ueno | F01P 7/16 137/468 |
| 2016/0108797 A1 | * | 4/2016 | Palumbo | G05D 23/022 236/34.5 |
| 2016/0333767 A1 | * | 11/2016 | Pottie | F01P 7/16 |
| 2018/0059693 A1 | | 3/2018 | Rodriguez | |
| 2018/0223508 A1 | | 8/2018 | Fassolette | |

* cited by examiner

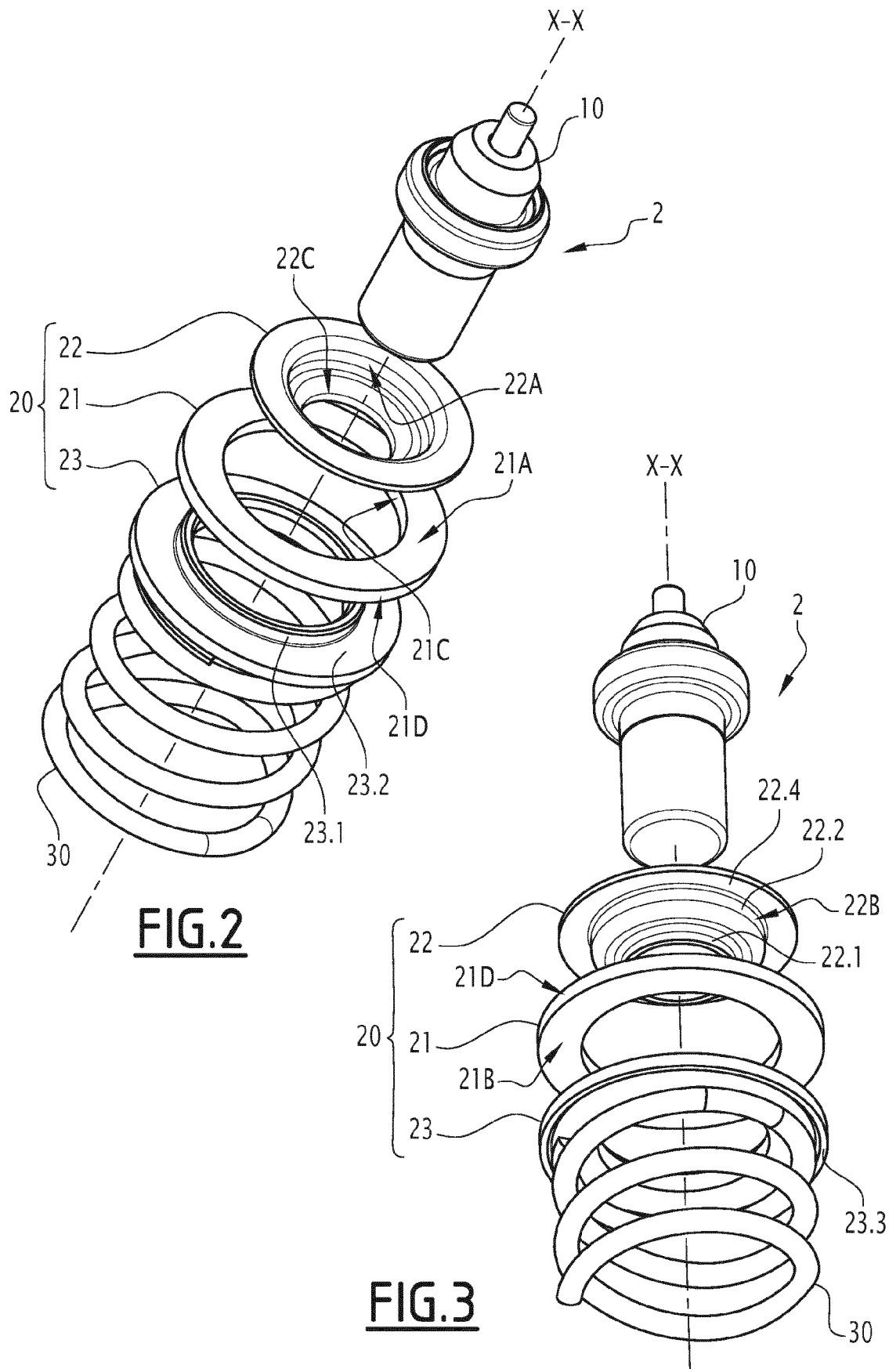

THERMOSTATIC DEVICE FOR CONTROLLING THE CIRCULATION OF A FLUID, AND THERMOSTATIC VALVE INCLUDING SUCH A DEVICE

CROSS-REFERENCE TO RELATED APPLICATIONS

This is a U.S. national phase application under 35 U.S.C. § 371 of International Patent Application No. PCT/EP2016/056547, filed Mar. 24, 2016, and claims benefit of priority to French Patent Application No. 15 52425, Mar. 24, 2015. The entire contents of these applications are hereby incorporated by reference.

TECHNICAL FIELD

The present invention relates to a thermostatic device, as well as a thermostatic valve comprising such a device.

The invention in particular relates to the thermostatic devices and valves that are used in cooling circuits of heat engines, in particular those of motor vehicles, heavy trucks, two-wheeled vehicles and stationary engines. That being said, this scope of application does not limit the invention, inasmuch as the device and the valve according to the invention can be used in various other fluid circuits, for example gearbox cooling circuits, water circuits, oil circuits, etc.

BACKGROUND

In many applications in the fluid field, in particular for cooling vehicle heat engines, thermostatic valves are used to regulate the flow of a fluid, i.e., to distribute this incoming fluid in different flow pathways, based on the temperature of that fluid. These valves are said to be thermostatic inasmuch as the movement of their inner obturator relative to the housing of the valve is controlled by a thermostatic element, i.e., an element that comprises a body, containing a thermodilatable material, and a piston, submerged in this thermodilatable material, the body and the piston being movable relative to one another in translation along the longitudinal axis of the piston, while either the body or the piston is, during use, fixedly connected to the housing of the valve.

To seal the contact between the obturator moved by the thermostatic element and a fixed seat of the housing, it is known to incorporate a gasket into the obturator. This gasket, typically made from a flexible material such as rubber or elastomer, is supported by a rigid frame of the obturator, this frame being, during use, fixedly connected to the moving part of the thermostatic element so that it can be driven by the thermostatic element. In practice, the gasket is kept in place on this frame by overmolding, crimping or shape matching. These solutions, which are old and very widespread, are effective, but relatively expensive to implement.

More recently, U.S. Pat. No. 8,028,926 proposed embedding a gasket between two plates of the obturator, which are fixedly secured to one another, in particular by clipping through the gasket, at least one of these plates being made from plastic. These two plates are provided to be coaxial and inwardly receive the moving part of the thermostatic element, to which they are fixedly connected during use. This solution has limited mechanical strength, regarding both high fluid pressures and over the long term, with leakage risks at the obturator.

SUMMARY

The aim of the present invention is to propose an improved thermostatic device, a sealing gasket of which is integrated into the obturator both cost-effectively and with good performance.

To that end, the invention relates to a thermostatic device for regulating a fluid flow, having:

a thermostatic element, which includes a fixed part, intended to be securely connected to a fluid channeling housing, and a moving part, movable along an axis relative to the fixed part, moving away from the fixed part under the action of expansion of a thermodilatable material of the thermostatic element, and an obturator, which is axially movable relative to a fixed seat of the housing so as to open and close a fluid flow passage and that is connected to the moving part of the thermostatic element such that, during expansion of the thermodilatable material, the moving part of the thermostatic element drives the obturator axially relative to the fixed seat, said obturator comprising:

a gasket that is suitable for being pressed sealably against the fixed seat when the fluid flow passage is closed by the obturator, a first piece that is made from metal and that is provided with an inner bore for receiving the moving part of the thermostatic element, and a second piece that is made from metal and that is separate from and attached around the first piece, the gasket being gripped axially between the first and second pieces, wherein a part, turned toward the axis, of the second piece of the obturator forms a peripheral rim to fasten the second piece to an outer face of the first piece of the obturator, and wherein the first piece of the obturator forms a stop for axially stopping the rim of the second piece, so as to position the first and second pieces axially relative to one another to apply a predetermined gripping force to the gasket.

One of the ideas at the base of the invention is that the obturator of the thermostatic device combines three separate pieces, namely a sealing gasket, typically made from rubber or elastomer, and two metal elements that firmly grip the gasket between them. One of the metal pieces has an inner bore so as to receive, and thus be fastened, during use, to the moving part of the thermostatic element. The other metal piece does not interact directly with the thermostatic element, but encircles the outer face of the first metal piece to be fastened thereto. It will be understood that, according to the invention, the fastening of the two metal pieces to one another can be done simply, robustly and cost-effectively, while guaranteeing effective and lasting retention of the gasket gripped between them: to that end, a peripheral rim, turned toward the central axis of the device, of the second piece fastens the latter to the outer face of the first piece, while axially cooperating with a dedicated stop of this first piece to control the stress with which the gasket is gripped between these two pieces. The thermostatic device according to the invention is easy to adapt to various assembly environments, in particular various cooperation interfaces with its obturator, subject to the adaptation of the outer diameter and/or thickness of the gasket, and if applicable, the adaptation of the outer diameter of the second metal piece. Furthermore, the three pieces of the obturator, which are the gasket and the aforementioned two metal pieces, can be assembled to one another independently from the rest of the thermostatic device, which amounts to saying that the obturator can be provided in the form of a preassembled subassembly, thus facilitating the manufacture and further improving the adaptability of the thermostatic device according to the invention. Advantageous practical aspects of the implementation of the invention are also given later, in the subsequent description.

According to additional advantageous features of the thermostatic device according to the invention:

the gasket is globally washer-shaped and substantially centered on the axis, and inwardly receives the rim of the second piece of the obturator;

the first piece is made by bending and/or stamping a sheet;

the second piece is made by bending and/or stamping a sheet;

the rim of the second piece has a U-shaped profile turned axially away from the axial stop of the first piece or a C-shaped profile turned away from the axis;

the gasket is flat;

the gasket is a shape gasket;

the rim of the second piece of the obturator is fitted gripped around the first piece;

the rim of the second piece of the obturator is made subject to an outer face of a ring of the first piece, which inwardly at least partially defines the inner bore for receiving the moving part of the thermostatic element;

a part, turned away from the axis, of the first piece of the obturator and a part, turned away from the axis, of the second piece of the obturator respectively form plates that extend transversely to the axis, and the gasket is gripped axially between the respective plates of the first and second pieces;

the stop of the first piece connects the ring to the plate of the first piece;

the plate of the second piece of the obturator is more extended, transversely to the axis, than the plate of the first piece, such that a part, turned away from the axis, of the gasket is free with respect to the first piece and supported by the plate of the second piece;

the thermostatic device further comprises a compression spring, which, during contraction of the thermodilatable material of the thermostatic element, returns the moving part toward the fixed part of the thermostatic element and axially drives the obturator relative to the fixed seat, said compression spring including a first end and a second end which are opposite, the first end of the compression spring being pressed axially against the housing while the second end of the compression spring is pressed axially against the second piece of the obturator;

the second piece of the obturator is provided with a relief for centering the second end of the compression spring on the axis.

The invention also relates to a thermostatic valve, including a housing, as well as a thermostatic device, which is as defined above and the fixed part of the thermostatic element of which is fixedly connected to the housing.

BRIEF DESCRIPTION OF THE DRAWINGS

The invention will be better understood upon reading the following description, provided solely as an example and done in reference to the drawings, in which:

FIGS. 2 and 3 are perspective views, from different respective viewing angles, of an exploded view of the thermostatic device belonging to the valves of FIG. 1;

DETAILED DESCRIPTION

FIGS. 1 to 4 show a valve 1 comprising a thermostatic device 2 for regulating the flow of a fluid. This fluid is for example a cooling fluid, the valve 1 in particular belonging to a cooling circuit of a heat engine, in particular a motor vehicle engine, this example not being limiting, however, as mentioned in the introductory part of this document.

Figure 1:
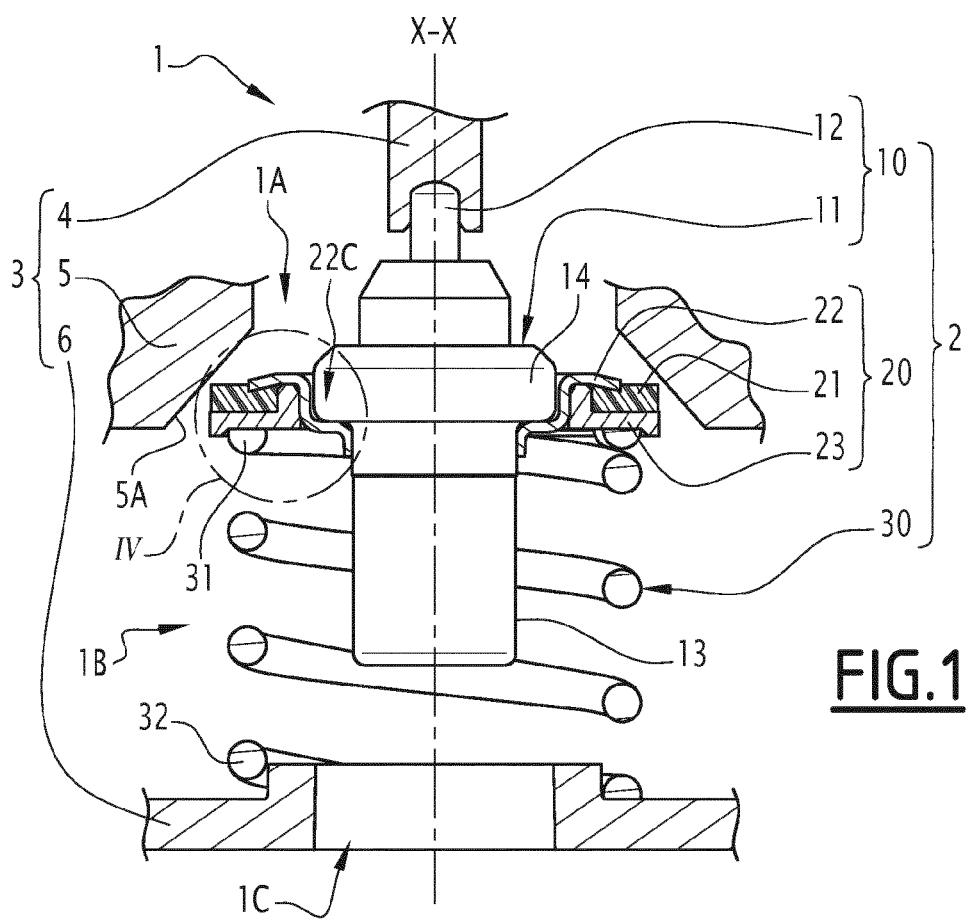
FIG. 1 is a longitudinal sectional view of a thermostatic valve according to the invention.

The thermostatic device 2 is shown alone in FIGS. 2 and 3, whereas in FIG. 1, this device 2 is arranged in parts 4, 5 and 6 of a housing 3 of the valve 1, having noted that these parts 4, 5 and 6 are fixed relative to one another, while for example being integral with and/or fixedly secured to one another, when the valve 1 is in use as shown in FIG. 1. In practice, in FIG. 1, the parts 4, 5 and 6 of the housing 3 are shown only partially and schematically, their embodiment not being limiting with respect to the invention. In all cases, when the valve 1 is in the usage configuration, the housing 3 channels the fluid by defining at least two flow paths 1A and 1B for the fluid: one of these paths constitutes a fluid inlet while the other constitutes a fluid outlet. In the embodiment considered in FIG. 1, the housing 3 defines a third fluid flow path 10, which may either be a fluid inlet or a fluid outlet for the valve 1. As an example, when the valve 1 belongs to a cooling circuit of an engine, the path 1A constitutes a cooling fluid inlet, coming from the engine to be cooled, whereas on the one hand, the path 1B constitutes a first outlet for this cooling fluid, sending the latter to a heat exchanger, in particular a radiator, designed to lower the temperature of the fluid traversing it, before this fluid is sent to the engine to be cooled, and on the other hand, the path 10 constitutes a second outlet for the cooling fluid, which directly sends the latter to the engine to be cooled, without going through the aforementioned heat exchanger.

The thermostatic device 2 includes a thermostatic element 10 that is centered on a geometric axis X-X. This thermostatic element 10 includes a body 11, centered on the axis X-X and containing a thermodilatable material such as a wax. The thermostatic element 10 also comprises a piston 12, the longitudinal geometric axis of which is aligned on the axis X-X within the device 2 and a terminal axial part of which is submerged in the thermodilatable material contained in the body 11. The body 11 and the piston 12 are translatable relative to one another along the axis X-X: under the effect of the expansion of the thermodilatable material, the piston 12 deploys outside the body 11, while, during a contraction of the thermodilatable material, the piston is retractable inside the body 11 under the effect of a return spring 30 described later.

Within the valve 1 when the latter is in use, the piston 12 of the thermostatic element 10 is securely fastened to the housing 3. More specifically, in a manner known in itself, the terminal part of this piston 12, opposite that submerged in the body 11, is securely fastened to the part 4 of the housing 3 arranged across the axis X-X. In practice, various embodiments can be considered regarding the secure fastening of the aforementioned terminal part of the piston 12 to the part 4 of the housing 3: this secure fastening can be done either solely by axial bearing, or by removable fastening, of the clipping or sliding fitting type, or by permanent securing of the forced fitting type, overmolding, or addition of a mechanical maintaining system. In all cases, it will be understood that, when the thermodilatable material of the body 11 of the thermostatic element 10 expands or contracts, the piston 12 is kept immobile relative to the housing 3, due to the secure fastening of its aforementioned terminal part to the part 4 of this housing.

The thermostatic device 2 also comprises an obturator 20 that is movable along the axis X-X relative to a fixed seat 5A of the part 5 of the housing 3, so as to open and close a corresponding fluid flow passage, defined between the seat and the obturator: within the valve 1 during use, when the obturator 20 is pressed against the seat 5A, this obturator closes the aforementioned passage and therefore prevents the fluid from flowing between the paths 1A and 1B, whereas, when the obturator 20 is separated from the seat 5A as in the operating configurations shown in FIG. 1, the obturator 20 opens the aforementioned passage and therefore allows fluid to flow between the paths 1A and 1B. The obturator 20 is therefore comparable to a gate.

To control the movement of the obturator 20, the latter is securely fastened to the body 11 of the thermostatic element 10 such that, within the valve 1 when it is in use, the axial movement of the body 11 relative to the housing 3, resulting from the expansion of the thermodilatable material, causes a corresponding movement of the obturator 20 so as to open the aforementioned passage, by axial separation of this obturator 20 with respect to the fixed seat 5A.

For convenience, the rest of the description is oriented relative to the axis X-X, such that the adjective "inner" describes an element facing toward the axis X-X, while the adjective "outer" describes an element facing away from the axis X-X. Likewise, the terms "upper", "top" and similar terms describe an element which, in the direction of the axis X-X, faces the top of FIGS. 1 to 4, while the terms "lower", "bottom" and similar terms describe an element facing the opposite direction. Thus, in the example considered here, the piston 12 is arranged above the body 11, its terminal part, submerged in the body 11, being its lower terminal part, while its terminal part fixedly connected to the part 4 of the housing 3 is its upper terminal part.

Figure 4:
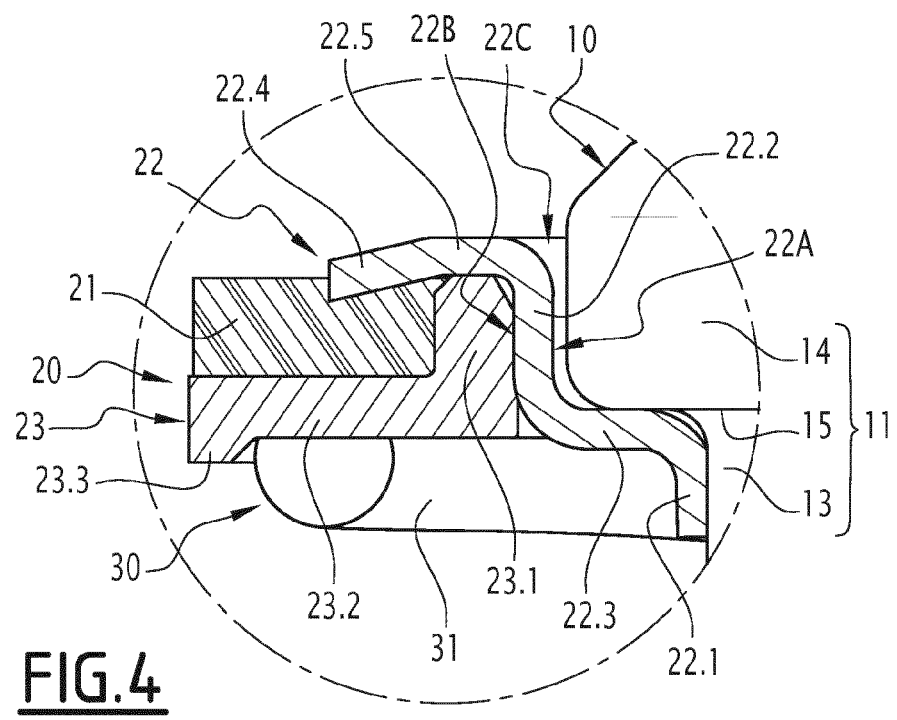
FIG. 4 is an enlarged view of the circled detail IV in FIG. 1.

As clearly shown in FIGS. 2 to 4, the obturator 20 comprises, as piece separate from the rest of the obturator, a gasket 21. This gasket 21 is made from elastomer or rubber, or more generally, a flexible material compared to the rest of the obturator 20, such that the gasket 21 is designed, when the obturator 20 closes the aforementioned fluid flow passage, to be pressed flexibly, or even elastically, against the seat 5A of the part of the housing 3 and thus to seal the contact between this seat and the obturator. Thus, the gasket 21 can be described as a sealing gasket for the obturator 20.

In the embodiment considered in figures, the gasket 21 is a flat gasket, which is globally washer-shaped, centered on the axis X-X. This flat washer shape is particularly cost-effective. As clearly shown in FIGS. 2 to 4, the gasket 21 has two opposite main faces, i.e., an upper face 21A and a lower face 21B. When idle, i.e., when no stress is exerted on the gasket 21, like in FIGS. 2 and 3, the upper 21A and lower 21B faces of the gasket are planar and respectively extend in geometric planes perpendicular to the axis X-X. The upper 21A and lower 21B faces thus respectively correspond to crowns, within the mathematical meaning of the term, centered on the axis X-X. The upper 21A and lower 21B faces are connected to one another by peripheral edges, inner 21C and outer 21D, respectively, of the gasket 21. When idle, these peripheral edges 21C and 21D are parallel to the axis X-X, such that, when idle, the gasket 21 has, in an axial half-sectional plane, a rectangular section.

The obturator 20 also comprises, as piece separate from the rest of the obturator, a metal piece 22, which includes all of the part of the obturator 20 situated, at any axial level, radially closest to the axis X-X, and which, as a result, is subsequently called insert. As clearly shown in FIGS. 2 and 3, the insert 22 has a globally tubular and stepped shape, which is substantially centered on the axis X-X and outside which the rest of the obturator 20 is arranged in full. The insert 22 thus has inner and outer faces, respectively referenced 22A and 22B.

As clearly shown in FIG. 4, the insert 22 comprises a lower ring 22.1 and an upper ring 22.2, centered on the axis X-X. The lower ring 22.1 has inner and outer diameters are respectively smaller than the inner and outer diameters of the upper ring 22.2, such that the insert 22 includes a shoulder part 22.3 that connects the upper end of the lower ring 22.1 to the lower end of the upper ring 22.2, while extending globally in a geometric plane perpendicular to the axis X-X. The inner diameter of the lower ring 22.1 is substantially complementary to the outer diameter of a shell, and the inner diameter of the upper ring 22.2 is substantially complementary to the outer diameter of a peripheral collar 14 of this body 11, which is arranged radially protruding toward the outside of the shell 13: in the assembled state of the thermostatic device 2, the body 11 of the thermostatic element 10 is received in a substantially complementary manner in a bore 22C that defines the inner face 22A of the insert 22 at the rings 22.1 and 22.2 of this insert 22. More specifically, as clearly shown in FIG. 4, the upper terminal part of the shell 13 is housed in the lower ring 22.1 and the lower terminal part of the collar 14 is housed in the upper ring 22.2, a shoulder 15 formed at the junction between the shell 13 and the collar 14 being received in planar contact against the shoulder part 22.3 of the insert 22. Inasmuch as no direct interaction occurs between the body 11 of the thermostatic element 10 and the rest of the obturator 20, it will be understood that the insert exclusively provides the connection between the obturator and the body of the thermostatic element. According to one practical and effective possible embodiment, the fixed connection between the body 11 of the thermostatic element and the insert 22 of the obturator 20 is done by tight fitting of the lower ring 22.1 around the shell 13 of the body 11. Of course, by way of other alternatives, other possibilities for producing this fixed connection can be considered.

The obturator 20 further comprises, also as piece separate from the rest of the obturator, a metal piece 23 that is arranged coaxially and around the insert 22. The piece 23 has a globally annular shape, centered on the axis X-X, which, in the assembled state of the thermostatic device 2, surrounds the body 11 of the thermostatic element 10 with radial interposition of at least part of the insert 22.

More specifically, the inner part of the piece 23 forms a peripheral rim 23.1 designed to encircle and be fastened to the outer face 22B of the insert 22. In the example embodiment considered in figures, this rim 23.1 of the piece 23 is made subject to the outer face of the upper ring 22.2 of the insert 22, while in particular being fitted tightened around this ring 22.2. This embodiment is cost-effective to carry out and ensures strong fastening between the insert 22 and the piece 23. This being said, other embodiments can be considered for fastening of the rim 23.1 of the piece 23 to the outer face 22B of the insert 22.

In the assembled state of the thermostatic device 2, the gasket 21 is axially gripped between the insert 22 and the piece 23. According to one practical and effective embodiment, which is implemented in the example considered in the figures, the insert 22 and the piece 23 to that end include respective plates 22.4 and 23.2, which belong, or even make up, the respective outer parts of the insert 22 and piece 23. As clearly shown in FIG. 4, each plate 22.4, 23.2 extends, from the rest of the insert 22, from the piece 23, respectively, transversely to the axis X-X: more specifically, in the considered example, the plate 23.2 extends globally in a geometric plane perpendicular to the axis X-X, while the plate 22.4 is slightly inclined downward moving away from the axis X-X. Irrespective of their embodiment, the plates 22.4 and 23.2 axially grip the inner part of the gasket 21 between them so as to apply a gripping stress to the latter such that the gasket 21 is kept firmly in place. In other words, in the inner part of the gasket 21, the upper face 21A of the latter is pressed downward by the plate 22.4 of the insert 22 and its lower face 21B is pressed upward by the plate 23.2 of the piece 23.

Advantageously, the plate 23.2 of the piece 23 is more extended, radially to the axis X-X, than the plate 22.4 of the insert 22, such that, as clearly shown in FIG. 4, the outer part of the gasket 21 is free with respect to the insert 22, inasmuch as, in this outer part of the gasket 21, the upper face 21A of the latter is not covered by the plate 22.4. At the same time, in this outer part of the gasket 21, the lower face 21B of the latter is covered by the plate 23.2, which therefore downwardly supports the gasket 21 over a larger, or even the entire, radial expanse of this gasket. In this way, a substantial part of the upper face 21A of the gasket 21 remains free so as to be able to be pressed cleanly against the seat 5A of the part 5 of the housing 3 when the obturator 20 closes the aforementioned fluid flow passage, while, at the same time, the lower face 21B of the gasket is supported by the plate 23.2 of the piece 23. The sealing performance of the gasket 21 is improved as a result.

As clearly shown in FIGS. 2 and 4, the plate 23.2 extends outward from the lower end of the rim 23.1, while forming, at the connection between this rim and this plate, a bend turned upward. In the assembled state of the thermostatic device 2, the rim 23.1 is inwardly received in the washer-forming gasket 21. The inner peripheral edge 21C of the gasket 21 thus outwardly encircles the rim 23.1, while advantageously being adjusted on the outer diameter of this rim 23.1 for relative wedging reasons, in particular during the assembly of the obturator 20.

In order to control the gripping stress applied to the gasket 21 by the insert 22 and the piece 23, the insert 22 forms an upward axial stop 22.5 for the rim 23.1 of the piece 23. This stop 22.5 is arranged at the upper end of the upper ring 22.2, while connecting this upper end to the inner end of the plate 22.4. In the assembled state of the thermostatic device 2, the upper end of the rim 23.1 is pressed axially upward against the stop 22.5 of the insert 22, which axially positions the insert 22 and the piece 23 relative to one another, thus applying a predetermined gripping stress to the gasket 21.

As an optional development, the piece 23 is provided with a peripheral border 23.3 protruding from its lower face. As clearly shown in FIGS. 3 and 4, this border 23.3 is, in the example considered here, situated at the outer end of the lower face of the piece 23. This border 23.3 makes it possible to center, on the axis X-X, the upper end turn 31 of the return spring 30, pressed axially upward against the lower face of the piece 23. Indeed, the border 23.3 cooperates by shape matching with the turn 31, by encircling, in a substantially adjusted manner, the outer diameter of the upper end of this turn.

The aforementioned spring 30 is a compression spring that belongs to the thermostatic device 2. Within the valve 1 when the latter is in use, this spring 30 is provided to return the body 11 of the thermostatic element 10 toward the piston 12 of this thermostatic element during a contraction of the thermodilatable material, so as to command the closing of the aforementioned fluid flow passage via the driving, by the body 11, of the obturator 20 with respect to the seat 5A. To that end, the spring 30 is functionally interposed between the body 11 and the piston 12 of the thermostatic element 10 so as to be compressed in the axis X-X when the body 11 and the piston 12 move axially away from one another. More specifically in the embodiment considered here, the spring 30 is physically interposed, in the axis X-X, between the obturator 20 and the part 6 of the housing 3, the upper end turn 31 being pressed axially against the piece 23 while, axially opposite the turn 31, a lower end turn 32 of the spring 30 is pressed axially downward against the part 6 of the housing 3.

As described above, the insert 22 and the piece 23 are made from metal, for example made from stainless steel. The insert 22, which includes the lower ring 22.1, the shoulder part 22.3, the upper ring 22.2, the stop 22.5 and the plate 22.4 in a single-piece manner, is for example made by bending and/or stamping a sheet. The piece 23, which includes the rim 23.1, the plate 23.2 and the border 23.3 in a single-piece manner, is, in the embodiment considered in FIGS. 1 to 4, made by machining and/or pressing a washer.

Irrespective of their individual embodiments, the three component pieces of the obturator 20, i.e., the gasket 21, the insert 22 and the piece 23, are preferably assembled to one another independently from the rest of the thermostatic device 2. Thus, independently of the thermostatic element 10 and the compression spring 30, the insert 22 and the piece 23 are fastened to one another while gripping the gasket 21 between them, obtaining the obturator 20 in the assembled state as described above and as shown in FIGS. 1 to 4. Then, the obturator 20, as preassembled subassembly, is assembled to the thermostatic element 10 and the compression spring 30, the obtained thermostatic device 2 being arranged inside the housing 3 to form the valve 1. In this way, it will be understood that the preassembled assembly formed by the obturator 20 is interchangeable within the thermostatic device 2, and therefore within the valve 1. In other words, by modifying the shape and/or dimension specificities of the gasket 21 and/or the insert 22 and/or the piece 23, the obturator 20 is easily adaptable to thermostatic elements, compression springs and valve housings, functionally similar to the thermostatic element 10, the compression spring 30 and the housing 3 described thus far, but having different shapes and sizes.

Figure 5:
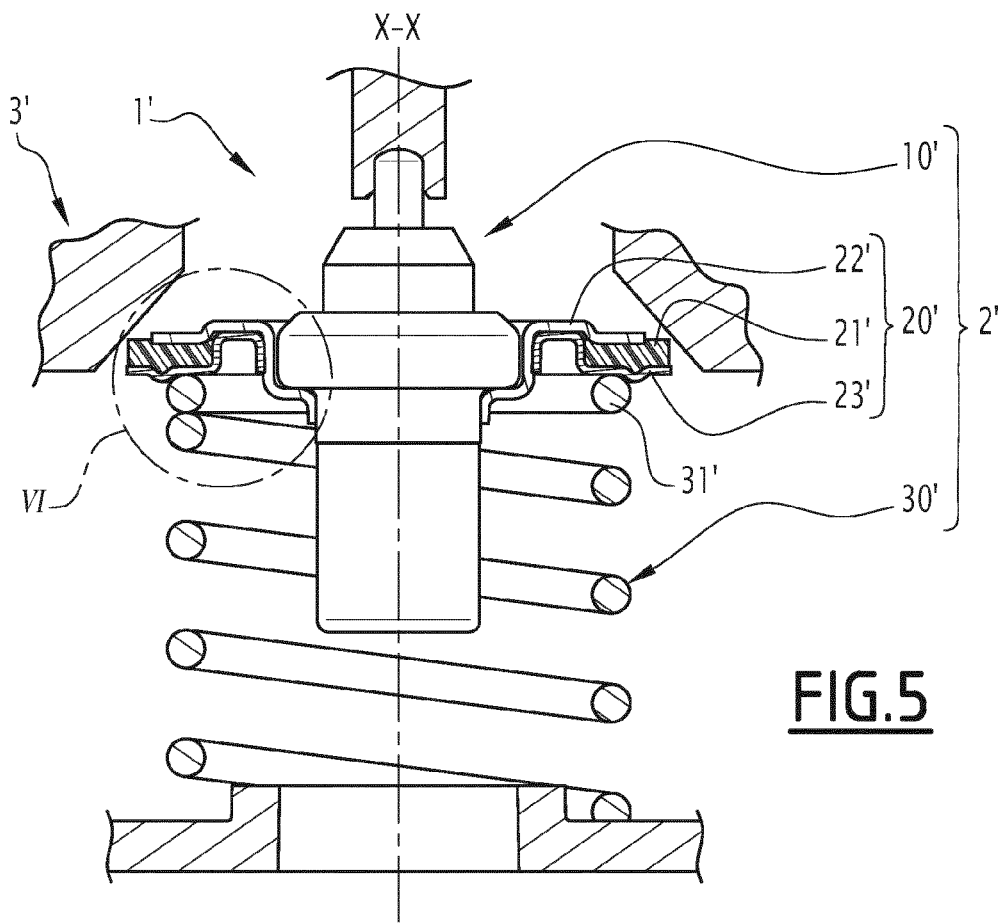
FIG. 5 is a longitudinal sectional view of an alternative example of the thermostatic valve according to the invention.
Figure 6:
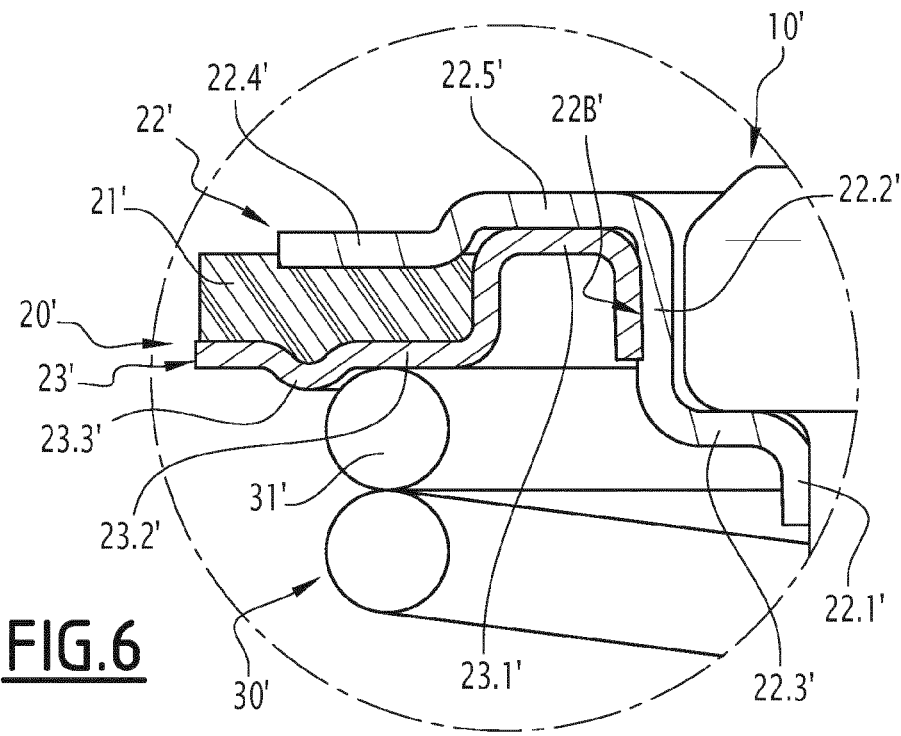
FIG. 6 is an enlarged view of the circled detail VI of FIG. 5.

FIGS. 5 and 6 show a thermostatic valve 1' that is an alternative of the valve 1 described thus far. The valve 1' comprises a housing 3' and a thermostatic device 2', which are respectively similar, both functionally and structurally, to the housing 3 and the thermostatic device 2 of the valve 1. The thermostatic device 2' comprises a thermostatic element 10', an obturator 20' and a compression spring 30', which are respectively similar, both functionally and structurally, to the thermostatic element 10, the obturator 20 and the compression spring 30 of the device 2.

The obturator 20' is made up of:
a gasket 21' that is similar, both functionally and structurally, to the gasket 21 of the obturator 20, an insert 22' that is functionally similar to the insert 22 of the obturator 20, and a piece 23' that is functionally similar to the piece 23 of the obturator 20.

Structurally, the insert 22' includes a lower ring 22.1', a shoulder part 22.3', an upper ring 22.2', an axial stop 22.5' of the plate 22.4', which are respectively similar to the corresponding components 22.1, 22.3, 22.2, 22.5 and 22.4 of the insert 22, with the main difference that the plate 22.4' extends globally in a plane perpendicular to the axis X-X.

Structurally, the piece 23' of the obturator 20' includes a rim 23.1' and a plate 23.2' that are similar to the corresponding components 23.1 and 23.2 of the piece 23, with the main difference that the rim 23.1' and the plate 23.2' are obtained by bending and/or stamping a sheet. In particular, the rim 23.1' has, in an axial half-sectional plane, an upside down U-shaped profile. Thus, the part of the rim 23.1' corresponding to the bottom of the U-shaped profile and the part of the rim 23.1' corresponding to the branch of the U-shaped profile that connects the aforementioned bottom to the plate 23.2', ensure the axial positioning of the piece 23', and thus the application of a predetermined gripping stress to the gasket 21', while being pressed axially upward against the stop 22.5' of the insert 22'. Additionally, it is the part of the rim 23.1' corresponding to the other branch of the U-shaped profile that cooperates with the outer face 22B' of the insert 22' in order to fasten the piece 23' with the insert 22', in particular by encircling the ring 22.2' of the insert 22' in a fitted gripped manner.

Additionally, on its lower face, the plate 23.2' is provided with a boss 23.3', which is functionally similar to the border 23.3 of the piece 23 of the obturator 20, inasmuch as this boss 23.3' is configured to center the upper end turn 31' of the spring 30'.

Figure 7:
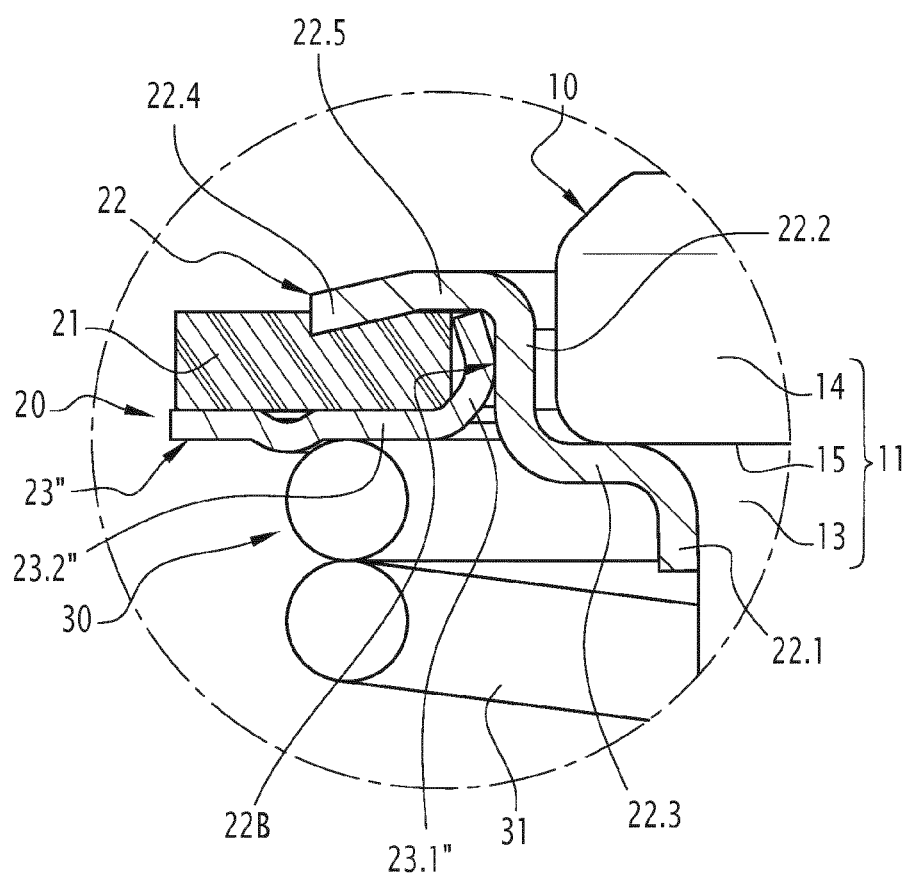
FIG. 7 is a view similar to FIG. 4, illustrating another alternative according to the invention.

FIG. 7 shows an alternative of the thermostatic device 2, which only differs from the embodiment shown in FIGS. 1 to 4 by its piece 23", its other components being identical to those shown in FIGS. 1 to 4, and therefore bearing the same references. The piece 23" is functionally similar to the piece 23, with the difference that this piece 23" is obtained by stamping and/or bending. Thus, structurally, the piece 23" includes a rim 23.1" and a plate 23.2" that are functionally similar to the rim 23.1 and the plate 23.2 of the piece 23.

This alternative illustrates the multitude of shapes that the piece 23, 23', 23" may assume, in particular at its rim 23.1, 23.1', 23.1" for fastening to the outer face 22B, 22B' of the insert 22, 22'. In particular, even when it is stamped and/or bent, this fastening rim is not limited to having a U-shaped profile like for the rim 23.1', the rim 23.1" for example having a C-shaped profile turned opposite the axis X-X: the part of the rim 23.1" corresponding to the upper end of this C-shaped profile is pressed axially upward against the stop 22.5 of the insert 22 so as to control the gripping stress applied to the gasket 21; additionally, the part of the rim 23.1" corresponding to the curved intermediate segment of the C-shaped profile is fitted around the ring 22.2 of the insert 22, thus fastening the part 23" to the outer face 22B of the insert.

Various arrangements and alternatives to the devices 2 and 2', as well as the valves 1 and 1', described thus far may also be considered. As examples:

rather than fixedly connecting the piston 12 of the thermostatic element 10, 10' to the housing 3', the body 11 of this thermostatic element may be provided to be fixed relative to the housing, the piston then constituting the moving part of the thermostatic element, while performing the driving function described above for the body 11; and/or rather than being securely connected to the moving part of the thermostatic element, the obturator 20, 20' may be mounted on this moving part with a free movement along the axis X-X, on the condition that it is associated with a dedicated return spring; the obturator 20, 20' then incorporates a deballasting function in case of overpressure at the corresponding fluid flow passage; and/or the embodiment of the thermostatic element 10, 10' is not limiting, inasmuch as this element may optionally be controlled, i.e., incorporate a heating electric resistance, or may assume various diameters, etc.;

the body 11 of the thermostatic element 10, 10' may, at its lower end, be provided with a downward extension, which movably bears an obturator other than the obturator 20, 20', in order to command the flow of fluid in the path 10 of the valve 1, 1', thus adjusting a bypass function within a cooling circuit of an engine; and/or rather than being flat, the gasket 21, 21' may be a shape gasket, in particular with a lobed and/or polygonal profile.

The invention claimed is:

1. A thermostatic device for controlling a fluid flow, comprising:

a thermostatic element, which includes a fixed part, intended to be securely connected to a fluid channeling housing, and a moving part, movable along an axis relative to the fixed part, moving away from the fixed part under the action of expansion of a thermodilatable material of the thermostatic element, and an obturator, which is axially movable relative to a fixed seat of the housing so as to open and close a fluid flow passage and that is connected to the moving part of the thermostatic element such that, during expansion of the thermodilatable material, the moving part of the thermostatic element drives the obturator axially relative to the fixed seat, wherein the obturator comprises:

a first piece that is made from metal and that is provided with an inner bore for receiving the moving part of the thermostatic element, the first piece including a ring which has an inner face and an outer face, the inner face at least partially defining the inner bore, wherein the obturator further comprises a second piece that is made from metal and that is separate from the first piece, the second piece including a part that is turned toward the axis and that forms a peripheral rim, which is made subject to the outer face of the ring and which is fitted gripped around the outer face of the ring to fasten the second piece to the first piece, wherein the obturator further comprises a gasket, which is arranged axially between the first and second pieces and which is suitable for being pressed sealably against the fixed seat when the fluid flow passage is closed by the obturator, wherein the first piece forms a stop for axially stopping the peripheral rim upon fitting gripping the peripheral rim around the outer face of the ring, so as to position the first and second pieces axially relative to one another to apply to the gasket a predetermined gripping force that alone keeps in place the gasket between the first and second pieces, wherein a part, turned away from the axis, of the first piece and a part, turned away from the axis, of the second piece respectively form plates that extend transversely to the axis, and wherein the gasket is gripped axially between the respective plates of the first and second pieces so that the respective plates of the first and second pieces apply the predetermined gripping force to the gasket, and wherein the stop of the first piece integrally connects the ring to the plate of the first piece.

2. The thermostatic device according to claim 1, wherein the gasket is globally washer-shaped and substantially centered on the axis, and inwardly receives the peripheral rim.

3. The thermostatic device according to claim 1, wherein the first piece is made by bending and/or stamping a sheet.

4. The thermostatic device according to claim 1, wherein the second piece is made by bending and/or stamping a sheet.

5. The thermostatic device according to claim 4, wherein the peripheral rim has a U-shaped profile turned axially away from the stop of the first piece.

6. The thermostatic device according to claim 1, wherein the gasket is flat.

7. The thermostatic device according to claim 1, wherein the gasket is a shape gasket.

8. The thermostatic device according to claim 1, wherein the plate of the second piece is more extended, transversely to the axis, than the plate of the first piece, such that a part, turned away from the axis, of the gasket is free with respect to the first piece and supported by the plate of the second piece.

9. The thermostatic device according to claim 1, wherein the thermostatic device further comprises a compression spring, which, during contraction of the thermodilatable material of the thermostatic element, returns the moving part toward the fixed part of the thermostatic element and axially drives the obturator relative to the fixed seat, said compression spring including a first end and a second end which are opposite, the first end of the compression spring being pressed axially against the housing while the second end of the compression spring is pressed axially against the second piece.

10. The thermostatic device according to claim 9, wherein the second piece is provided with a relief for centering the second end of the compression spring on the axis.

11. A thermostatic valve, including a housing and a thermostatic device according to claim 1, whereof the fixed part of the thermostatic element is fixedly connected to the housing.

12. The thermostatic device according to claim 4, wherein the peripheral rim has a C-shaped profile turned away from the axis.

13. A thermostatic device for controlling a fluid flow, comprising:
a thermostatic element, which includes a fixed part, intended to be securely connected to a fluid channeling housing, and a moving part, movable along an axis relative to the fixed part, moving away from the fixed part under the action of expansion of a thermodilatable material of the thermostatic element, and
an obturator, which is axially movable relative to a fixed seat of the housing so as to open and close a fluid flow passage and that is connected to the moving part of the thermostatic element such that, during expansion of the thermodilatable material, the moving part of the thermostatic element drives the obturator axially relative to the fixed seat,
wherein the obturator comprises a first piece that is made from metal and that is provided with an inner bore for receiving the moving part of the thermostatic element, the first piece including a ring which has an inner face and an outer face, the inner face at least partially defining the inner bore,
wherein the obturator further comprises a second piece that is made from metal and that is separate from the first piece, the second piece including a part that is turned toward the axis and that forms a peripheral rim, which is made subject to the outer face of the ring and which is fitted gripped around the outer face of the ring to fasten the second piece to the first piece,
wherein the obturator further comprises a gasket, which is arranged axially between the first and second pieces and which is suitable for being pressed sealably against the fixed seat when the fluid flow passage is closed by the obturator,
wherein the first piece forms a stop for axially stopping the peripheral rim upon fitting gripping the peripheral rim around the outer face of the ring, so as to position the first and second pieces axially relative to one another to apply to the gasket a predetermined gripping force that alone keeps in place the gasket between the first and second pieces,
wherein a part, turned away from the axis, of the first piece and a part, turned away from the axis, of the second piece respectively form plates that extend transversely to the axis, and wherein the gasket is gripped axially between the respective plates of the first and second pieces so that the respective plates of the first and second pieces apply the predetermined gripping force to the gasket, and
wherein the plate of the second piece is more extended, transversely to the axis, than the plate of the first piece, such that a part, turned away from the axis, of the gasket is free with respect to the first piece and supported by the plate of the second piece.

14. The thermostatic device according to claim 13, wherein the gasket is globally washer-shaped and substantially centered on the axis, and inwardly receives the peripheral rim.

15. The thermostatic device according to claim 13, wherein the thermostatic device further comprises a compression spring, which, during contraction of the thermodilatable material of the thermostatic element, returns the moving part toward the fixed part of the thermostatic element and axially drives the obturator relative to the fixed seat, said compression spring including a first end and a second end which are opposite, the first end of the compression spring being pressed axially against the housing while the second end of the compression spring is pressed axially against the second piece.

16. The thermostatic device according to claim 15, wherein the second piece is provided with a relief for centering the second end of the compression spring on the axis.

17. A thermostatic device for controlling a fluid flow, comprising:
a thermostatic element, which includes a fixed part, intended to be securely connected to a fluid channeling housing, and a moving part, movable along an axis relative to the fixed part, moving away from the fixed part under the action of expansion of a thermodilatable material of the thermostatic element, and
an obturator, which is axially movable relative to a fixed seat of the housing so as to open and close a fluid flow passage and that is connected to the moving part of the thermostatic element such that, during expansion of the thermodilatable material, the moving part of the thermostatic element drives the obturator axially relative to the fixed seat, wherein the obturator comprises a first piece that is made from metal and that is provided with an inner bore for receiving the moving part of the thermostatic element, the first piece including a ring which has an inner face and an outer face, the inner face at least partially defining the inner bore, wherein the obturator further comprises a second piece that is made from metal and that is separate from the first piece, the second piece including a part that is turned toward the axis and that forms a peripheral rim, which is made subject to the outer face of the ring and which is fitted gripped around the outer face of the ring to fasten the second piece to the first piece, wherein the obturator further comprises a gasket, which is arranged axially between the first and second pieces and which is suitable for being pressed sealably against the fixed seat when the fluid flow passage is closed by the obturator, wherein the first piece forms a stop for axially stopping the peripheral rim upon fitting gripping the peripheral rim around the outer face of the ring, so as to position the first and second pieces axially relative to one another to apply to the gasket a predetermined gripping force that alone keeps in place the gasket between the first and second pieces, and wherein the thermostatic device further comprises a compression spring, which, during contraction of the thermodilatable material of the thermostatic element, returns the moving part toward the fixed part of the thermostatic element and axially drives the obturator relative to the fixed seat, said compression spring including a first end and a second end which are opposite, the first end of the compression spring being pressed axially against the housing while the second end of the compression spring is pressed axially against the second piece.

18. The thermostatic device according to claim 17, wherein the gasket is globally washer-shaped and substantially centered on the axis, and inwardly receives the peripheral rim.

19. The thermostatic device according to claim 17, wherein a part, turned away from the axis, of the first piece and a part, turned away from the axis, of the second piece respectively form plates that extend transversely to the axis, and wherein the gasket is gripped axially between the respective plates of the first and second pieces so that the respective plates of the first and second pieces apply the predetermined gripping force to the gasket.

20. The thermostatic device according to claim 17, wherein the second piece is provided with a relief for centering the second end of the compression spring on the axis.

* * * * *